COLOR TELEVISION CAMERA SYSTEM

Filed Nov. 7, 1968

INVENTOR.
MARK LOWENSTEIN

BY

Frank R. Trifari

AGENT

INVENTOR.
MARK LOWENSTEIN
BY
Frank R. Trifari
AGENT

INVENTOR.
MARK LOWENSTEIN
BY
Frank R. [signature]
AGENT

INVENTOR.
MARK LOWENSTEIN
BY
Frank R. Trifari
AGENT

INVENTOR.
MARK LOWENSTEIN
BY
AGENT

INVENTOR.
MARK LOWENSTEIN
BY
Frank R. Trifari
AGENT

Oct. 13, 1970 M. LOWENSTEIN 3,534,160

COLOR TELEVISION CAMERA SYSTEM

Filed Nov. 7, 1968 10 Sheets-Sheet 7

INVENTOR.
MARK LOWENSTEIN

BY

Frank R. Trifari
AGENT

INVENTOR.
MARK LOWENSTEIN
BY
Frank R. Trifari
AGENT

INVENTOR.
MARK LOWENSTEIN

BY

AGENT

INVENTOR.
MARK LOWENSTEIN

BY Frank R. [signature]
AGENT 3,534,160
COLOR TELEVISION CAMERA SYSTEM
Mark Lowenstein, Stamford, Conn., assignor, by mesne assignments, to U.S. Philips Corporation, New York, N.Y., a corporation of Delaware
Filed Nov. 7, 1968, Ser. No. 774,026
Int. Cl. H04n 9/04
U.S. Cl. 178—5.4 15 Claims

ABSTRACT OF THE DISCLOSURE

A color television camera system in which camera control signals are time multiplexed and video and monitor signals are frequency multiplexed for transmission between a control unit and a camera unit. The control signals are in the form of digital coded signals added to the backporches of signals transmitted from the control unit to the camera unit.

This invention relates to a color television camera system.

In one sense, the components of a color television camera may be separated functionally and physically into a control unit, a camera unit, and a transmission path between these units. The camera unit generally includes the camera tubes and associated circuitry such as preamplifiers and deflection circuits for the yokes, and a viewfinder system. The control unit, on the other hand, includes various processing circuits such as signal matrices, encoding circuits, and modulating circuits, as well as control circuits for these and other functions. The camera operator thus serves the function mainly of pointing the camera and providing a few adjustments, while the operator at the control unit continually controls the processing circuits to provide the desired output signal. This type of arrangement has the advantage that the complexity and weight of the camera unit is minimized and the camera men can concentrate on aiming the camera to get the most desirable scene. A drawback in such a system, however, exists in the necessary cables for interconnecting the two units, which severely limit the freedom of the cameraman. In one example of a camera system of this type the interconnecting cable has 82 conductors, weighs more than a pound per foot, and is about 1¼ inches in diameter. Aside from being cumbersome, such a cable is also quite expensive. The large number of conductors in the cable are required, for example, since for a high quality picture accurate registration control is required, which is more easily accomplished at the control unit. The control conductors for registration must, however, extend between the two units since components in the camera unit must be controlled in order to achieve the desirable registration.

The disadvantage of the cumbersome transmission cable is not serious in fixed camera installations, such as in the case of studio cameras. In semi-fixed locations, however, where the control unit may be installed in a van, storage and handling of the cable, which may be up to 5,000 feet, presents a serious problem, and the quality of the picture can be degraded by such long multiconductor cables. In addition, it has been found that in such installations, interference between the video signal and other signals in the cable is common.

While camera signals can be transmitted from a transmitted carried by the cameramen or a nearby assistant, in order to provide complete portability, this type of system in the past has resulted in greatly increased weight in the camera unit, and has reduced or eliminated the control of camera functions such as registration by the control unit operator. A consequent reduction in picture quality is produced.

It is therefore apparent that while color camera systems presently employed can provide high quality pictures, there are limitations or their use due to the desirable separation of control and camera functions, and that the provision of a simple transmission link between the units has not in the past been able to overcome the problem.

According to the invention, these problems are overcome by converting the control signals originating in the control unit to a digital code that is transmitted to the camera unit on the backporches of external video signals which are also transmitted from the control unit. For synchroniation purposes color subcarrier oscillations are transmitted from the control unit with the external video signals, and audio signals originating at the camera unit are modulated on the subcarrier oscillations. The above signals from the control unit, and the camera video and camera monitor signals are frequency multiplexed in the transmission path. Control functions in the camera are controlled by decoding means for decoding the digital code signals received from the control unit. The monitor signals originating in the camera unit can be selected by means of the digital code signals. Audio signals are transmitted from the camera as pulse width modulated signals during the blanking periods of the monitor signals, and various voltages in the camera unit are monitored by the transmission of pulse signals during selected line periods of the monitor signals. With this arrangement, the transmission link between the camera and control units can be a two or three conductor cable or a radio link without degrading the picture signals, and by using integrated circuitry, a smaller and lighter camera can be employed. The resulting system is thus more convenient to handle and more versatile than previous systems.

While the specification concludes with claims particularly pointing out and distinctly claiming the subject matter of the invention, it is believed that the invention will be better understood from the following description taken in connection with the accompanying drawings.

Figure 1:
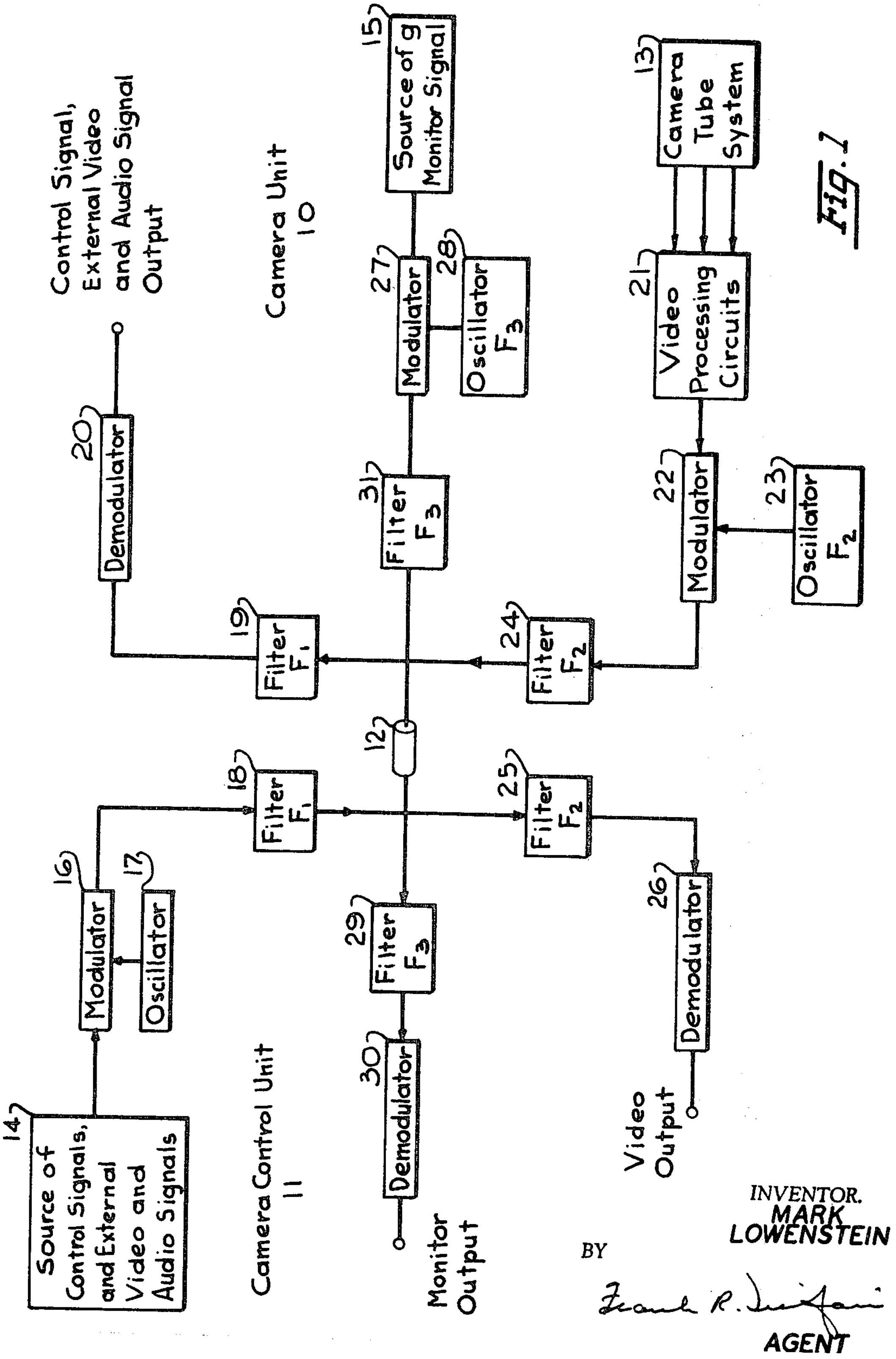
FIG. 1 is a block diagram of a color television camera system according to the invention.

Referring now to the drawings, and more in particular to FIG. 1, therein is illustrated a block diagram of a color television camera system according to the invention. The system is comprised of a camera unit 10 which may be, for example, a studio camera or a portable camera and is generally adapted to be aimed by a cameraman, and a camera control unit 11 which may have a fixed loction, such as in a studio, or a semi-fixed location such as in a van. These two units are interconnected by a transmission path illustrated for the sake of simplicity in FIG.

1 as a coaxial cable 12. The transmission path may of course alternately comprise any other conventional transmission path such as, for example, a radio link.

In the system of FIG. 1, the signals which are interchanged between the camera unit and the control unit are separated into three groups. One group of signals is the video signals which are generated in the camera tube system 13 and are to be sent to the control unit by way of the transmission path. The second group of signals is the control signals and information signals, from a source 14 in the control unit that are to be sent from the control unit to the camera unit, and the third group of signals are the monitor signals from a source 15 in the camera unit that are to be sent to the control unit. These three groups of signals are frequency multiplexed in order to permit their separation in the control and camera units and to avoid interference.

In the system of FIG. 1, the signals from the source 14 in the control unit are modulated in modulator 16 on oscillations of a frequency $F_1$, from oscillator 17, and these modulated oscillations are applied to the cable 12 by way of a bandpass filter 18. Signals of the frequency $F_1$ are separated in the camera unit by means of bandpass filter 19, and the output of the filter 19 is connected to a demodulator 20. The signals from camera tube system 13 are first applied to video signal processing circuits 21, which will be described in more detail in the following paragraphs, and the output of the processing circuits 13 is modulated, in modulator 22, on carrier oscillations of a frequency $F_2$ from oscillator 23 and applied to the cable 12 by way of bandpass filter 24 tuned to the frequency $F_2$. In the control unit the modulated video signals are separated in a bandpass filter 25 tuned to the carrier frequency $F_2$, and are demodulated in demodulator 26 to provide the video signal output. The monitor signals from the camera unit are modulated in modulator 27 on oscillations of a third frequency $F_3$ from oscillator 28, and are applied to the cable 12 in the camera unit by way of filter 31 tuned to the frequency $F_3$. In the control unit 11 the modulated monitor signals are separated in a bandpass filter 29 tuned to the carrier frequency $F_3$, and are demodulated in demodulator circuit 30.

As an example, the frequency $F_1$ on which the telecommand signals are modulated may be 10 mHz., the frequency $F_2$ on which the video signals are modulated may be 24 mHz., and the frequency and the frequency $F_3$ on which the monitor signals are modulated may be 45 mHz.

Figure 2:
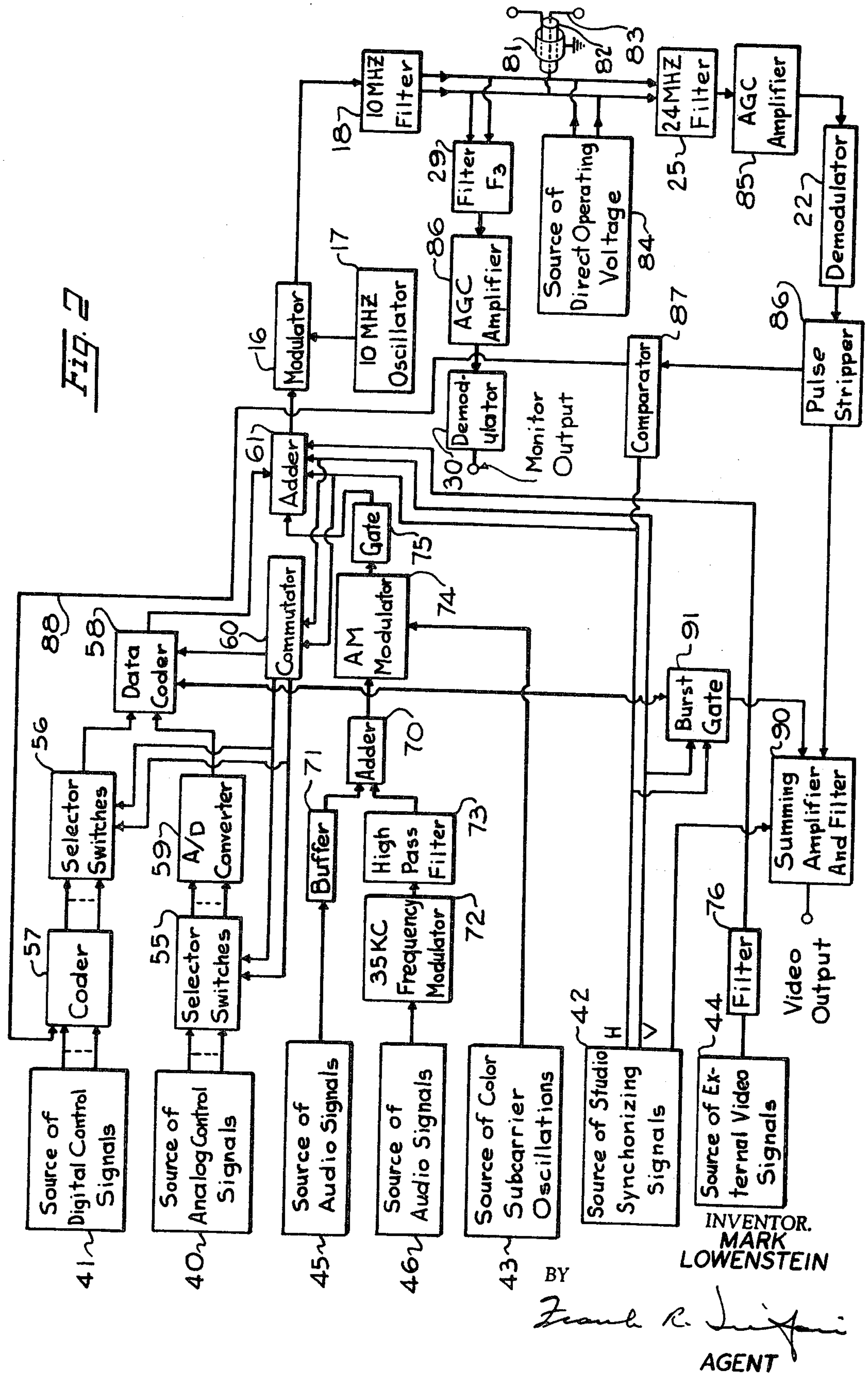
FIG. 2 is a more detailed block diagram of the camera system of FIG. 1.

A more detailed block diagram of the control unit 11 is illustrated in FIG. 2. The control unit comprises a source 40 of analog control signals and a source 41 of digital control signals for controlling the operation of the camera. Typical control signal functions will be discussed in more detail with reference to the detailed description of the camera unit. The control signals may be manually adjusted by the operator at the control unit, or may be automatically produced at the control unit. The analog control signals may consist, for example, of a series of potentiometers which are adjustable to provide control voltage in the range of 0 to 5 volts. As will be apparent in the later discussion, the preferred embodiments of the system is capable of employing 62 control signals, which may include any desired combination as analog and digital signals.

The control unit (FIG. 2) also includes a source of studio synchronizing signals 42, and a source of color subcarrier oscillations 43 of, for example, nominally 3.58 mHz. In addition, the control unit includes a source 44 of external video signals for display on the view finder at the camera, and sources 45 and 46 of audio signals in order to enable the control unit operator to communicate with the cameraman. The control unit 11 is adapted to be interconnected with a plurality of separate camera units, and the use of two or more sources of audio signals permits selective communication with the different camera units. It will therefore be apparent that additional audio signal sources may be employed for modulation on the output signals of the control unit in the same manner, but at a different frequency, as the signals from source 46.

Figure 3:
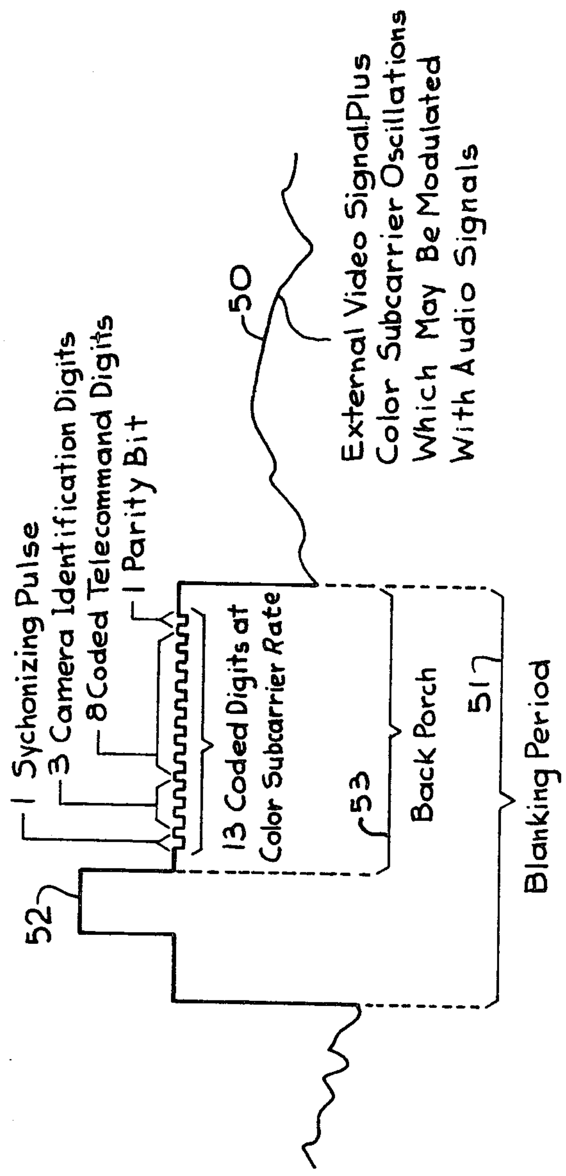
FIG. 3 is a diagram illustrating the form of signals transmitted from the control unit of FIG. 2.

In order to facilitate understanding of the system of FIG. 2, an example of the output of the control unit is shown in FIG. 3. The signals during the sweep portion 50 consists of the external video signals from source 44. These signals have a limited bandwidth in order that they do not interfere with the color subcarrier oscillations which are also transmitted during the sweep period 50. The color subcarrier oscillations are amplitude modulated with the audio signals, which may in turn be modulated on low frequency oscillations. The degrading of the external video signals by limiting their bandwidth is not a serious disadvantage, since it is not necessary that the picture appearing on the camera view finder be as broadcast quality. During the blanking period 51, the signals from the control unit include the conventional deflection synchronizing pulse 52, and the back porch 53 contains 13 coded digits having a pulse repetition frequency equal to the frequency of the color subcarrier. The first coded digit is a synchronizing pulse for initiating operation of the decoding unit at the camera. The next three coded digits are camera identification signals which are provided in order that the control signal is processed only by the desired camera. The next eight coded digits are telecommand digits for controlling the operation of various functions at the camera unit. The last coded digit is a parity check bit which is provided in order to reduce the possibility of error in the operation of the system, for example, due to interference introduced in the transmission path. The blanking period of each line of the signals transmitted by the control unit corresponds to a separate predetermined control function, so that the control functions are selected at the camera on a basis of the number of the line during which they were transmitted. In a preferred system according to the invention, the sequence of control signals is repeated four times during each frame period, so that coded telecommand signals corresponding to 62 different control functions may be sequentially transmitted four times during each frame without interference with the vertical blanking signals. When the coded telecommand signals correspond to analog control signals from the source 40, they represent in coded form the amplitude of the analog signals. When the coded telecommand signals on a given line correspond to the output of the source of digital signals 41, they are in coded form so that the signal represents, during any line, any one of 256 control operations.

Referring again to FIG. 2, the outputs of the source 40 of analog signals are applied to a set of selector switches 55, and the outputs of the source 41 of digital control signals are applied to a set of selector switches 56 by way of a digital coder 57. By way of example, if it is desired that during 60 lines the telecommand signals will correspond to analog control signals, 60 outputs of the source 40 will be applied in parallel to the selector switches 55, and for the remaining two lines in the coded telecommand signal sequence, 16 outputs from the coder 57 will be applied in parallel to the selector switches 56. The selector switches 55 and 56 serve the function of selecting the control signals corresponding to the correct control function, and for this purpose horizontal and vertical synchronizing signals derived from the source 42 are applied to a commutator 60 for obtaining switching signals for the selector switches 55 and 56. The selector switches 55 and 56 may, for example, be in the form of cross bar matrices having semiconductor elements such as field effect transistors at the cross points, the semiconductor elements being controlled by the output of the commutator 60.

The output of the selector switch 56 of FIG. 2, which is in digital form, is applied to a data coder 58 for storage. The output of the selector switches 55, which is analog form, is converted to a digital code in analog to digital converter 59, which may be of conventional construction, and the output of the converter 59 is also applied to the data coder 58 for storage. For any given line, the output of only one of the selectors 55 and 56 are applied to the data coder 58. The commutator 60 also provides a gating pulse for the data coder 58 to permit reading out of the data coder to an adder 61 during the back porch intervals. Since the pulse repetition frequency of the coded pulses is at the color subcarrier rate, subcarrier oscillations from source 40 are applied to the data coder 58 to provide sequential read out of the data coder during the back porch intervals. The output of the data coder 58 is a sequential series of 13 pulses occurring at the color subcarrier rate during the back porch intervals. The camera identification signals, that is, the second, third and fourth digit positions of the coded signals, are derived from the source of digital control signals 41, which may consist of a plurality of manually selected switches. The parity check bit, which may be an odd parity check bit, is derived and added to the signal in the data coder 58.

Audio signals from the source 45 of FIG. 2 are applied to an adder 70 by way of a buffer amplifier 71. Audio signals from the source 46 are frequency modulated in modulator 72, having a carrier frequency of, for example, 35 kilocycles, and the output of the modulator 72 is also applied to the adder 70 by way of a high pass filter 73. Frequency modulation has been employed for the modulator 72 as a matter of convenience, and this form of modulation is not critical for the operation of this system. The outputs of the buffer amplifier 71 and filter 73 are added together linearly in the adder 70 and then applied to an amplitude modulator 74 where they are modulated on color subcarrier oscillations from a source 43. The output of the modulator 74 is applied to the adder 61 by way of a gate 75. The gate 75 is controlled by horizontal synchronization pulses from the source 42 in order to pass the modulated subcarrier only during the sweep periods, so that the modulated oscillations will not interfere with the digital control signals. While this results in line frequency interference in the audio signals, the interference may be readily filtered out in the camera unit. The modulated subcarrier oscillations are not gated at the vertical rate since this would produce frequency components within the audio pass band. In regard to the audio signal channel, it is pointed out that the modulation must not be at a high level. Since the color subcarrier signal is necessary for subcarrier synchronization in the camera unit, it is essential that the subcarrier does not disappear. For this reason, a high modulation percentage or balanced modulation are not desirable.

The external video signals from source 44 are also applied to the adder 61 by way of filter 76. The filter 76 removes components of the external video signals that might interfere with the modulate color subcarrier oscillations. Horizontal and vertical synchronizing pulses are also added to the signals in adder 61, since the external video signals from source 44 do not have synchronizing signals. The external video signals of source 44 may be derived from other camera units, and are employed at the camera for comprising purposes.

The output of the adder 61 is modulated in modulator 16 on, for example, 10 megacycle oscillations from oscillator 17, and applied to the 10 megacycle filter 18.

In the system of FIG. 2, the transmission link between the control unit and the camera unit is in the form of a triax cable having a grounded outer shield 81, an inner shield 82, and an inner conductor 83. The output of the filter 18 is applied between the inner conductor 83 and the inner shield 82 of the triax cable. Monitor signals received by the control unit are applied from the inner conductor and inner shield of the triax cable to the filter 29, and camera video signals received by the control unit are applied from the inner conductor 83 and the inner shield 82 to the filter 25. In order to reduce weight in the camera unit, a source 84 of direct operating voltage to provide operating power for the camera unit may also be connected between the inner conductor 83 and inner shield 82 of the triax cable. In the system of FIG. 2, a gain controlled amplifier 85 is provided between the camera video filter and demodulator 22, and a gain controlled amplifier 86 is provided between the monitor signal filter 29 and the modulator 30. The gain controlled amplifiers 85 and 86 serve to compensate for frequency dependent attenuation in the transmission length between the control unit and camera.

Still referring to FIG. 2, pulses occurring on the camera video signal output of demodulator 22 during blanking periods are removed in a pulse stripper 86, and applied to a phase comparator 87, in which they are compared with the synchronization pulses from the source 42 of studio synchronizing signals. The comparator 87 provides a digital output signal corresponding to the relative phases of the camera and studio synchronizing signals, and this digital signal is applied to the coder 57 by way of lead 88 in order to provide a correction signal for the phase of the synchronizing pulses in the camera unit. The video output of the pulse stripper 86 with pulses removed is applied to a summing amplifier and filter 90, wherein synchronization pulses from the source 42 are added to the output signal. A color subcarrier burst signal derived from a source 43 of subcarrier oscillations is applied to the summing amplifier 90 by way of a burst gate 91, gate 91 being controlled by synchronizing signals from the source 42. The output of the summing amplifier 90 is therefore a complete composite color television signal.

Figure 4:
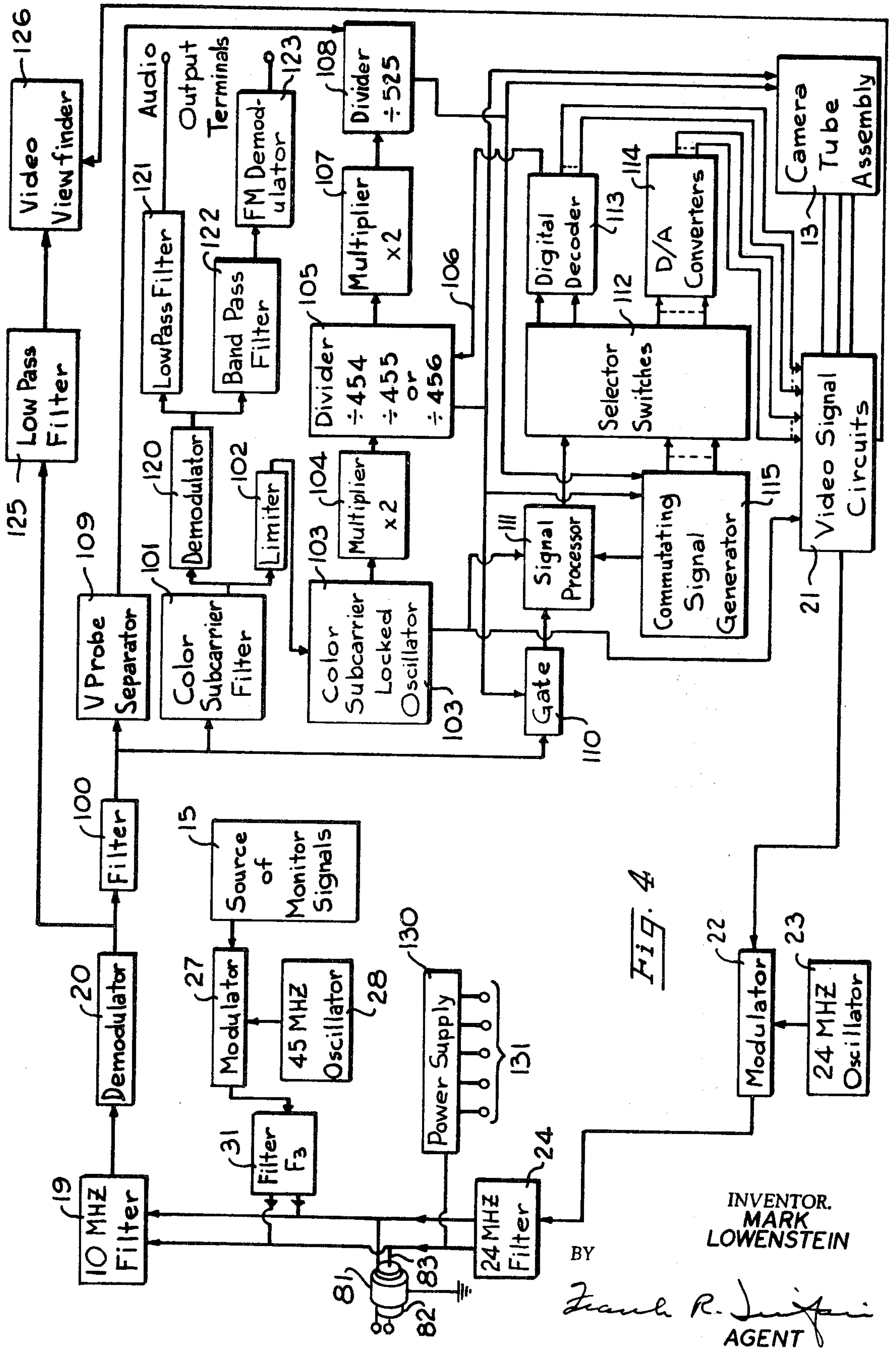
FIG. 4 is a more detailed block diagram of the camera unit of the system of FIG. 1.

The camera unit 10 is shown in more detail in the block diagram of FIG. 4. In this system, telecommand signals from the control unit are applied by way of inner conductor 83 and shield 82 of the triax cable to the filter 29 and thence to the demodulator 20. The output of the demodulator 20 is applied by way of a buffer filter 100 and a color subcarrier filter 101 to a limiter 102. The limiter 102 removes the audio modulation from the subcarrier oscillations, and the output of the limiter 102 is applied as a synchronizing signal to a color subcarrier locked oscillator 103. In order to provide a source of line frequency pulses, the output of the locked oscillator is applied by way of a multiplier 104, having a multiplication of 2 to a frequency divider 105. The divider 105 has a variable division ratio of 454, 455 or 456, which may be selected by means of a digital control signal appearing on lead 106. The signal on lead 106 is responsive to the output of the comparator 87 in the control unit, and serves to maintain the output of the divider 105 continuously in synchronism with the studio synchronizing signal source in the control unit. In order to derive a pulse train at the vertical frequency rate, the output of the divider 105 is multiplied in multiplier 107 having multiplication factor of 2, the output of the multiplier 107 being divided in a frequency divider 108 having a division ratio of 525. The divider 108 is synchronized with the studio synchronizing signal source in the control unit by means of a vertical pulse separator 109 connected to the output of filter 100. The output of the divider 108 is thus a train of synchronized vertical pulses.

The output of filter 100 in FIG. 4 is also applied by way of a gate 110 to a data signal processor 111. The gate 110 is opened only during the back porch intervals by means of pulses from the dividers 105 and 108. The signal processor 111, which will be discussed in more detail with reference to FIG. 6, includes circuits for detecting the camera identification code, the coded synchronizing digit, and the parity check bit in order to pass the coded digit signals only under the correct conditions. A group of selector switches 112, similar to those in the control unit, is provided to channel the outputs of the signal processor 111 to a digital decoder 113 or a digital-to-analog converter 114. The selector switches 112 are controlled by the outputs of a commutating signal generator 115 similar to the commutator of the control unit, the signal generator 115 being controlled by horizontal and vertical pulses from the dividers 105 and 108 respectively. The operation of the signal processor is controlled by color subcarrier oscillations from oscillator 103 and is gated by a signal from the signal generator 115. The selector switches, under the control of the commutating signal generator 115 direct the digital signals to the decoder 113 and converters 114 so that during blanking intervals corresponding to the times when digital control signals from source 41 in the control unit are transmitted, the output of the selector switches 112 is directed to the digital decoder 113, and during those lines corresponding to the times when signals from the source 40 are transmitted, the output of the selector switches 112 are applied to the digital-to-analog converters 104. The output of the digital decoder 113 is a plurality of bivalent switching or control signals each on a separate output lead. The output of the digital-to-analog converter 114 is a plurality of analog signals corresponding to the signals from source 40 in the control unit, each being applied to a separate control line. Thus, for example, in the preceding example, the digital-to-analog converter circuit 114 will have 60 output leads.

As in the system of FIG. 1, the outputs of the camera tube assembly 13 of FIG. 4, which are three separate color video signals, are applied to the video signal processing circuits 21, and thence are applied to a modulator 22. The deflection in the camera tube 13 is controlled by horizontal and vertical pulse outputs from the dividers 105 and 108 respectively. The video signal processing circuits are controlled, in a manner to be more completely described in the following paragraphs, by digital output signals from the decoder 113, by analog signals from the digital-to-analog converters 114, and by subcarrier oscillations derived from the oscillator 103.

The output of the color subcarrier filter 101 of FIG. 4 is also applied to a demodulator 120, the output of demodulator 120 being applied to a low pass filter 121 to derive audio signals corresponding to the signals from source 45 in the control unit. The output of demodulator 120 is also applied to a bandpass filter 122 and thence to an FM demodulator 123 in order to derive audio output signals corresponding to those from the source 46 in the control unit. The camera unit includes means, not shown, to enable the cameraman to select the desired audio output terminal to receive instructions from the control unit operator.

The output of demodulator 20 in FIG. 4 is also applied by way of a low pass filter 125 to the video view finder 126 in order to enable the cameraman to view the external video signals transmitted from the control unit. Alternatively, video signals for the view finder 126 may be derived from the video processing circuits 21.

The camera unit shown in FIG. 4 may also include a power supply 130 connected to the central conductor 83 and inner shield 82 of the triax cable. The power supply 130 may include a plurality of transistor DC-to-DC converters for providing the necessary operating potentials for the camera unit on output terminals 131.

Figure 5:
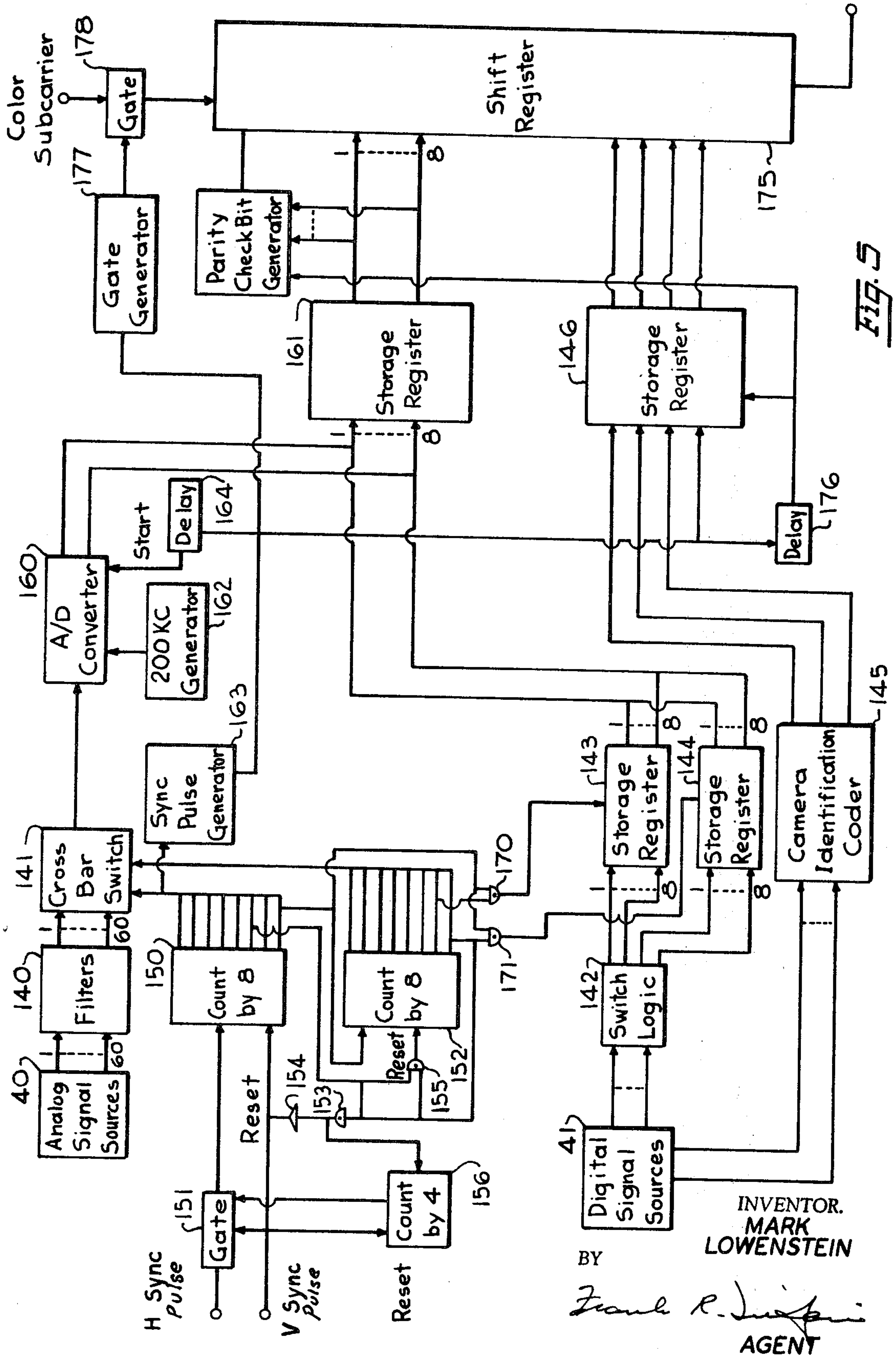
FIG. 5 is a block diagram of the signal coding system of the control unit of the television system of FIG. 1.

Referring now to FIG. 5, therein is illustrated a block diagram of a system which may be employed for the signal coding units of the control system of FIG. 2. In this system, assuming that 60 lines of each frame correspond to analog control signals, 60 outputs from the signal source 40 are applied by way of low pass filters 140, to separate input terminals of electronic cross bar switch 141. Bivalent outputs of the digital signal source

41 corresponding to circuit control functions in the camera unit, are applied by way of separate leads to a switching logic circuit 142 to provide coded digital signals. In the preceding example, where two lines of each coded signal sequence correspond to digital control signals, two storage registers 143 and 144 are provided connected to the outputs of the switching logic circuit 142, with eight outputs from the switching logic circuit 142 being applied in parallel to each of the storage registers 143 and 144. Bivalent camera identification signals, which may be controlled by simple selector switches are applied to a camera identification coder 145 which provides coded bivalent signals on three output leads corresponding to the selected camera to be controlled. The three outputs of the camera identification coder 145 are applied to a storage register 146.

As discussed above, it is preferred that a cycle of 62 coded telecommand signal groups be transmitted four times during each frame. The control signals for operating the selector switches for such a sequence may be obtained by count-by-eight counter 150 connected to count horizontal sync pulses applied by way of a gate 151, and to be reset by vertical sync pulses. The last output of the counter 150 is applied to a second count-by-eight circuit 152. The sixth output of counter 150 and the last output of counter 152 are applied by way of AND gate 153 and buffer amplifier 154 to the reset terminal of counter 150, and by way of AND gate 155 to the reset terminal of counter 152, in order that the counters have a cycle of 62 pulses.

The output of the AND gate 153 of FIG. 5 is also applied to a count by four circuit 156 in order to provide an output pulse that closes gate 151 after the cycle has repeated four times. The count by four circuit 156 is reset by the next vertical sync pulse, and the gate 151 is also opened by the next vertical sync pulse.

The 60 inputs of the cross bar switch matrix 141 are selectively gated to an analog-to-digital converter 160 during predetermined line periods by means of the output signals from the counters 150 and 152. The converter 160, which may be a conventional analog-to-digital converter, converts the analog input signal to an eight bit code which is applied to storage register 161. The converter 160 converts the analog signals to digital form during the line period preceding the blanking period during which they are transmitted. This provides adequate time so that the conversion may be accomplished at a relatively slow rate, for example, at a 200 kilocycle rate, so that the converter is not unduly complex. For this purpose, a 200 kilocycle generator 162 may be provided connected to the converter 160. Since it is necessary that the buffer storage register 161 be cleared prior to the storing therein of a new signal, the converter 160 is started by means of a synchronizing pulse obtained from a synchronizing pulse generator 163 which is delayed in delay circuit 164. The synchronizing pulse generator 163 is connected to an output of the counter 150 so that it provides a single pulse output at the start of each back porch during the counting cycle.

Selected outputs of the counters 150 and 152 of FIG. 5 are also applied to the storage registers 143 and 144 by way of AND gates 170 and 177 respectively to transfer the contents of these storage registers to the buffer storage register 161 during the line periods prior to the back porches when the coded telecommand signals correspond to digital signals from source 41. The cross bar switch matrix 141 is, of course, not energized during the two line periods when the registers 143 and 144 are read out.

A synchronizing pulse from generator 163 in FIG. 5 is also applied to storage register 146 to serve as a synchronizing pulse. Prior to each back porch during the counting cycle, the buffer storage 161 thus contains a digital signal corresponding to either an analog signal from source 40 or a digital signal from source 41, and the buffered storage 146 contains a digital signal corresponding to a camera identification, and a synchronizing bit. The buffer storages 161 and 146 are read out in parallel to a shift register 175 prior to the back porch period by means of a pulse from the generator 163 applied to both of the buffer storages by way of a delay circuit 176. The buffer storages are also cleared at this time to receive information for the next line transmission. The outputs of the buffer storage register 161 are also applied to a parity bit check generator in order to generate a parity check bit for the shift register 175. The operation of the parity bit generator may be initiated by the output pulse from the delay circuit 176.

The output pulse from the synchronizing pulse generator 163 of FIG. 5 is also applied to a gate generator 177, which may be a monostable multivibrator, in order to generate a gate during the back porch interval having a duration of 13 cycles of the color subcarrier. The gate generated by generator 177 is applied to a gate circuit 178 to permit the passage of 13 cycles of the color subcarrier oscillations to the shift register 175 during the back porch interval to effect the sequential read out and clearing of the shift register 175. The output of the shift register 175 is thus a 13 bit coded signal occurring during the back porch interval as shown in FIG. 3. This is the signal that is applied by the data coder 58 to the adder 61 of the system of FIG. 2.

Figure 6:
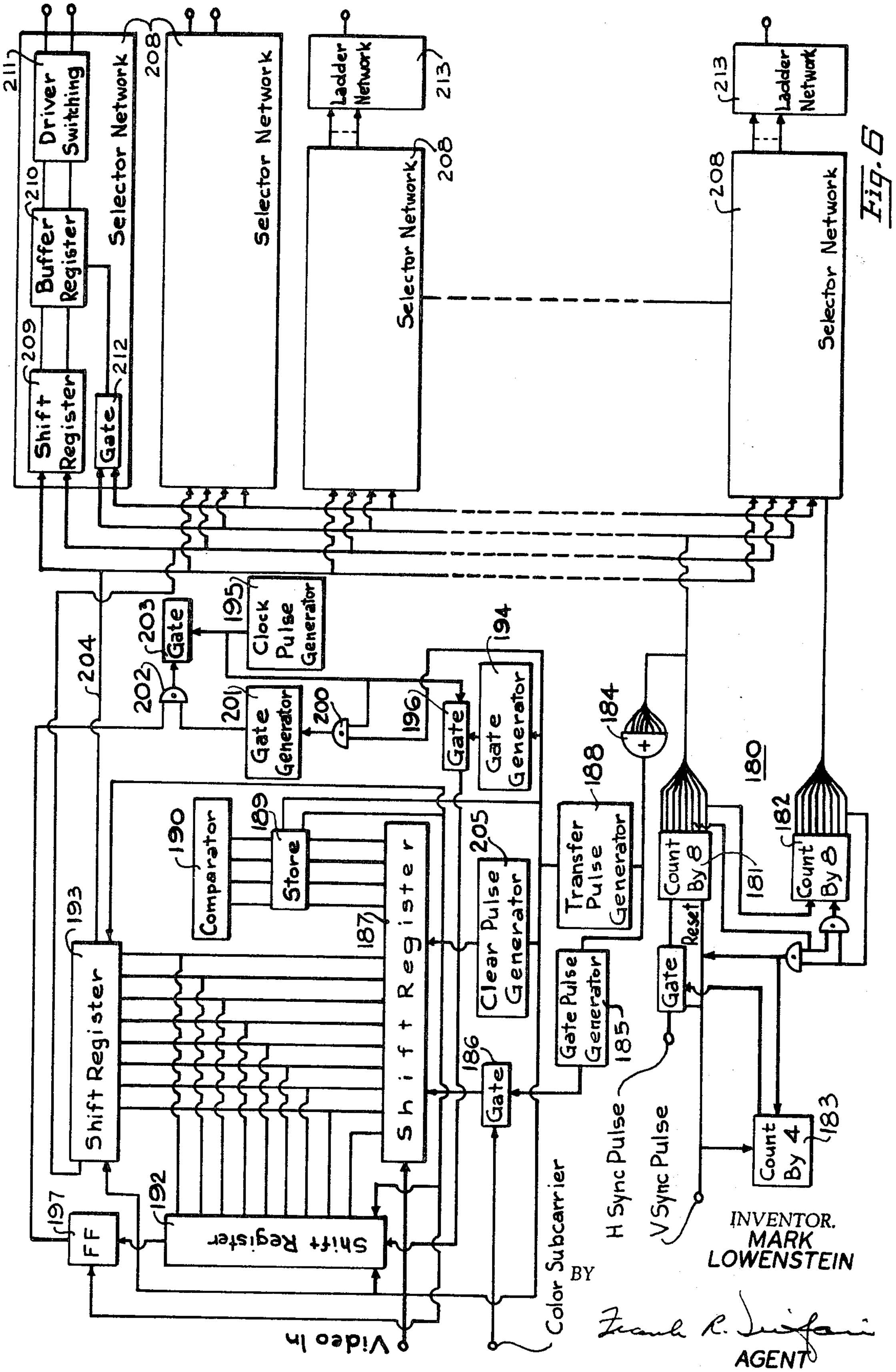
FIG. 6 is a block diagram of the signal decoding unit of the camera of the television of FIG. 1

A circuit which may be employed for the digital decoding circuits of the camera of FIG. 4 is illustrated in more detail in the block diagram of FIG. 6. This circuit comprises a counting circuit 180, which includes a count-by-eight circuit 181, a count-by-eight circuit 182, and a count-by-four circuit 183 connected in the same manner as the counters 150, 152 and 156 of the system of FIG. 5, in order to generate switching signals having four cycles of 62 pulses each following a vertical synchronizing signal. The outputs of the counter 181 are applied by way of an OR circuit 184 to a gate pulse generator 185, which may be a monostable multivibrator, for generating a gate signal of the length of the telecommand signal during the back porch intervals of the counting cycle. The gate output of generator 185 is employed to open a gate 186 to permit 13 cycles of color subcarrier oscillations to be applied to a shift register 187. These 13 cycles of color subcarrier oscillations are synchronized with the incoming digits of the telecommand signals, so that the telecommand signals applied to the shift register are synchronously stepped into the shift register 187 and stored temporarily therein.

The output of the OR gate 184 of FIG. 6 is also applied to a transfer pulse generator 188 which provides a transfer pulse output following each gate pulse from generator 185. The transfer pulse from generator 188 is applied to a storage circuit 189 for transferring the contents of the first four stages of shift register 187 to the storage circuit 189. These storage positions correspond to the synchronizing digit and the camera identification digits. The signals stored in storage circuit 189 are compared with preset digits in comparator 190 so that the comparator 190 provides an output signal only when a synchronizing digit is present and the camera identification digits correspond to the camera receiving the signal.

The transfer pulse from generator 188 of FIG. 6 is also applied to a shift register 192 to effect the transfer of the last 9 positions of the shift register 187 to the shift register 192, and the transfer pulse is also applied to a shift register 193 to effect the transfer of the eight coded telecommand digits from the register 187 to the register 193. In addition, the transfer pulse is also applied to a gate generator 194, which may be a monostable multivibrator, to produce a gate signal having a duration of nine cycles of the output of a clock pulse generator 195. The output of the clock pulse generator 195 is applied to the shift register 192 by way of a gate circuit 196 controlled by the gate from gate generator 194, in order to sequentially read out the shift register 192 to a flip-flop circuit 197. The flip-flop circuit 197 provides a parity check output after the shift register 192 has been read out if a correct coded signal has been received.

The transfer pulse from generator 188 of FIG. 6 and the output of the clock pulse generator 195 are also applied to an AND gate 200 to trigger a gate generator 201 for producing a gate signal having a duration equal to eight cycles of the clock pulse generator 195, the gate being delayed so that its leading edge occurs after the trailing edge of the gate from generator 194. The outputs of the gate generator 201, comparator 190, and flip-flop 197 are applied to an AND gate 202. The gate 202 will thus produce an output signal only when the comparator 190 output indicates that a sync pulse bit and the correct camera identification signal was received, and when the output of the flip-flop 197 indicates a correct partity check. The output of the gate 202 will thus be a gate of the same duration and timing as the output of the gate generator 201, and this gating signal is applied to a gate 203 connected to apply clock pulses from generator 195 to the shift register 193 to effect the sequential read out of the shift register 193 on lead 204. The signals on lead 204 will thus be eight coded digits corresponding to the eight telecommand signals.

The output of the transfer pulse generator 188 of FIG. 6 is also applied to a clearing pulse generator 205, which generates a clearing pulse occurring after the trailing edge of the gate from gate generator 201. The clearing pulse is applied to shift registers 187, 192 and 193, and to storage circuit 189 in order to clear these components. The clearing pulse is also applied to the flip-flop circuit 197 for resetting the flip-flop to a predetermined state.

Referring still to FIG. 6, a selector network 208 is provided for each control function. In the above example, there are thus 62 selector networks. The selector networks 208 are preferably identical, and each contain a shift register 209 having its outputs connected in parallel to a buffer register 210, with the outputs of the buffer register being connected to a set of driver switches 211. Each selector network also includes a gate 212 for producing a transfer pulse for the corresponding buffer register. The coded telecommand signals on lead 204 are applied to the shift register 209 of each of the selector networks 208. The clock pulse output from gate 203 is also applied to each shift register 209 to synchronously shift the information signals on lead 204 into each of the shift registers 209. The gates 212 are connected to be selectively operated by the switching outputs of the counters 181 and 182, so that each gate 212 applies a transfer pulse of its corresponding buffer register to effect the transfer of coded signals corresponding to a different control function. The buffer registers 210 are connected to their corresponding driver switches 211 to provide the desired outputs from the selector networks 208. For the selector networks 208 corresponding to control functions controlled by the digital signal source 41 of FIG. 5, the outputs of the buffer registers 211 provide the necessary control signals for the camera unit functions. The outputs of the selector networks 208 corresponding to control functions controlled by the analog signal source 40 of FIG. 5, however, are applied to resistive ladder networks for conversion to analog control signals for control of the circuits in the camera unit. In the above example, these are therefore two selector networks 208 without corresponding ladder networks for providing digital control signals, and 60 selector networks 208 with corresponding ladder networks 213 for providing analog control signals. The selector networks 208 may be integrated circuits.

Figure 7:
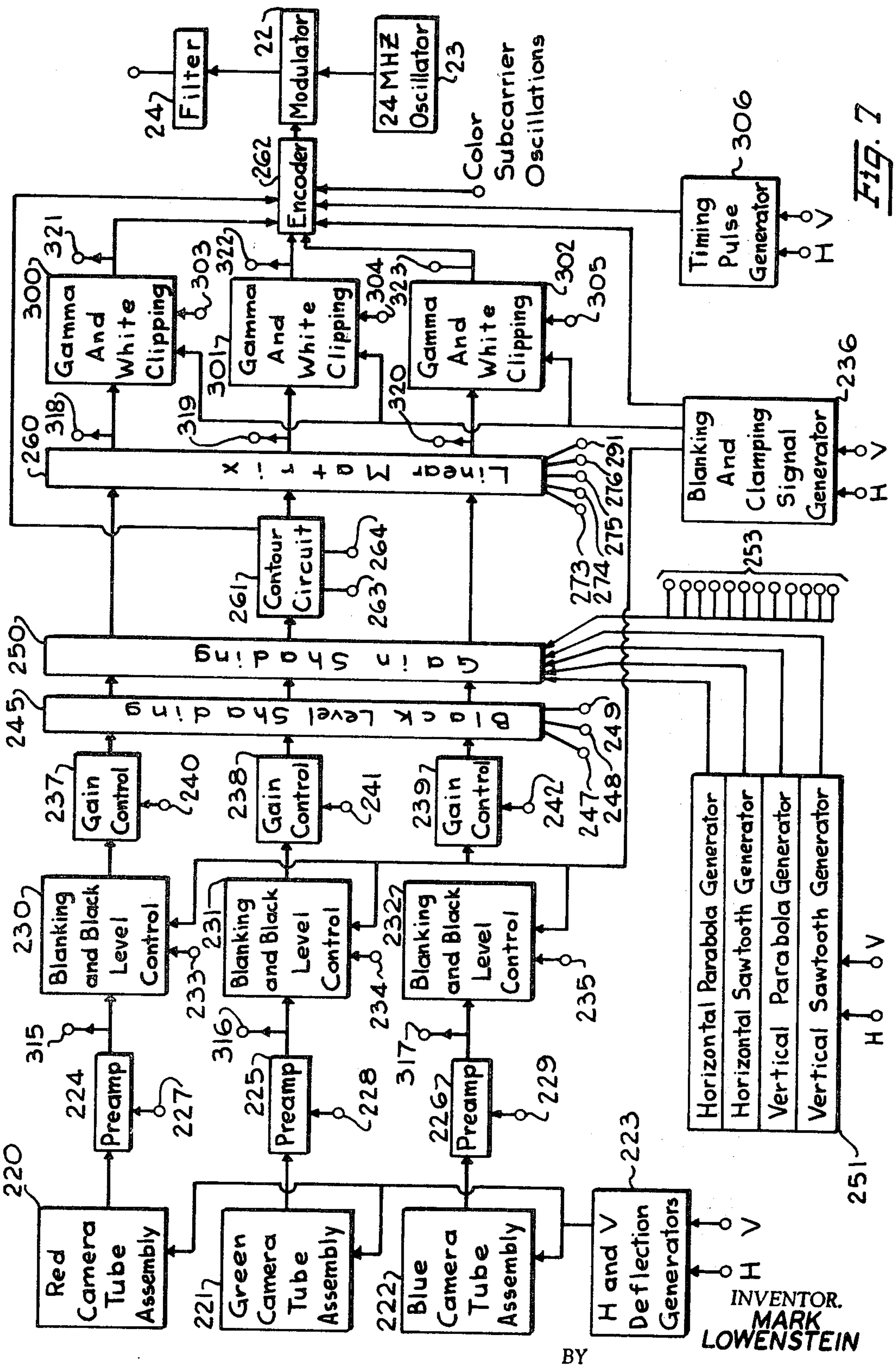
FIG. 7 is a block diagram of the video channel of the camera unit of the television system of FIG. 1.

Referring now to FIG. 7, which is a more detailed block diagram of the camera video channel, the camera tube assembly is comprised of a red camera tube assembly 220, a green camera tube assembly 221, and a blue camera tube assembly 222, each of these assemblies 220–222 includes a camera tube, such as a Plumbicon, and a deflection yoke. Deflection signals for the yokes of assemblies 220–222 are obtained from a horizontal and vertical deflection signal generator 223, which is synchronized by the horizontal (H) and vertical (V) synchronizing signals derived from dividers 105 and 108 respectively (FIG. 4). The outputs of the assemblies 220–222 are applied to preamplifiers 224, 225 and 226 respectively. The preamplifiers 224–226 are provided with gain control terminals 227, 228 and 229 respectively, which are adapted to be connected to separate outputs of the converter 114 (FIG. 4) to permit step control of the preamplifier gain at the control unit to provide, for example, plus or minus 6 db.

The outputs of the preamplifiers 224–226 of FIG. 7 are applied to blanking and black level control circuits 230, 231 and 232 respectively. These circuits serve to remove spurious noise from the video signals during blanking periods, and to permit control over the signal black level at the control unit by means of control voltages applied to the terminals 233, 234 and 235, respectively, from the converter 114 (FIG. 4). Blanking pulses for these circuits may be obtained from a blanking and clamping signal generator 236, controlled by the horizontal and vertical synchronizing signals, which provides blanking pulses during blanking periods. A satisfactory circuit for the blanking and black level control circuits is described in copending application Ser. No. 755,578, filed Aug. 27, 1968.

Additional control of the video signal gain is provided in the system of FIG. 7 by gain control amplifiers 237, 238 and 239 connected to the outputs of the blanking and black level control circuits 230–232 respectively. The amplifiers 237–239 are provided with terminals 240, 241 and 242 respectively which are connected to the converter 114 (FIG. 4) to permit control of signal gain by the control unit operator.

The outputs of the red, green and blue gain control amplifiers 237–239 of FIG. 7 respectively are applied to a black level shading circuit 245 having control terminals 247, 248 and 249 adapted to be connected to the converters 114 (FIG. 4) for controlling the black level shading. The red, green and blue outputs of the shading circuit 245 are applied to a gain shading circuit 250 to correct the gain of the signals as a function of the position of the signals with respect to the raster. For this purpose, a signal generator 251 providing horizontal and vertical parabolic and sawtooth waves is connected to the shading circuit 250, and 12 terminals 253 connected to the shading circuit 250 are provided for connection to separate outputs of the converter 114 (FIG. 4) in order to permit selective gain control of each of the color signals by the horizontal and vertical parabolic and sawtooth waves from generator 251.

The red and blue signal outputs of the shading circuit 250 of FIG. 7 are applied directly to a linear matrix circuit 260, while the green signal output of the shading circuit 250 is connected to the linear matrix circuit 260 by way of a contour circuit 261. The contour circuit 261 produces contour signals from the green video signals, and the contour signals thus produced are applied to an encoder 262 for addition to each of the video signals. While the contour signals may be added to the video signals prior to their application to the linear matrix 260, as shown in copending application Ser. No. 624,944, filed Mar. 21, 1967, it is preferred that the contour signals be added in the encoder after gamma correction. The conturo circuit is provided with a terminal 263 connected to the converter 114 (FIG. 4) to enable control of the contour signal from the control unit. The contour circuit is preferably preadjusted so that a single gain control (contour level) for the contour signal, connected to terminal 263, is adequate for both horizontal and vertical contour correction. The contour circuit 226 may also have a terminal 264 connecting an internal switch to the digital decoder 113 (FIG. 4), to permit the control unit operator to disengage this circuit.

The linear matrix is provided in the system of FIG. 7 in order to permit control of the color signals to compensate, for example, for color splitting errors in the optical system. A usual linear matrix for this purpose employs the matrix relationship:

$$\begin{vmatrix} R' \\ G' \\ B' \end{vmatrix} = \begin{vmatrix} a & b & c \\ d & e & f \\ g & h & i \end{vmatrix} \times \begin{vmatrix} R \\ G \\ B \end{vmatrix} \qquad (1)$$

where R, G and B are the input signals, R′, G′ and B′ are the modified signals, and *a–i* are the matrix variables which can be controlled to produce the desired output. Matrices of this type are conventionally fabricated from resistor networks and amplifiers. In the matrix of the above relationship, nine variables must be controlled, and balanced so that the sum of the coefficients in each row is equal to unity (e.g. where $R'=aR+bB+cB$, $a+b+c$ must equal unity). In order to reduce the number of variables that must be controlled, it is preferred that the matrix 260 (shown in more detail in FIG. 8) include a fixed matrix 270 for first converting the red (R), green (G) and blue (B) input signals to a luminance (M) signal, and two color difference signals $(R-M)$ and $(B-M)$ (for example) according to the matrix relationship:

$$\begin{vmatrix} M \\ R-M \\ B-M \end{vmatrix} = \begin{vmatrix} -\frac{1}{3} & -\frac{1}{3} & -\frac{1}{3} \\ -\frac{2}{3} & +\frac{1}{3} & +\frac{1}{3} \\ +\frac{1}{3} & +\frac{1}{3} & -\frac{2}{3} \end{vmatrix} \times \begin{vmatrix} R \\ G \\ B \end{vmatrix} \qquad (2)$$

A variable matrix 271 is then provided to convert these signals according to the matrix relationship:

$$\begin{matrix} M' \\ (R-M)' \\ (B-M)' \end{matrix} = \begin{vmatrix} 1 & 0 & 0 \\ 0 & j & k \\ 0 & 1 & m \end{vmatrix} \times \begin{vmatrix} M \\ R-M \\ B-M \end{vmatrix} \qquad (3)$$

where M′, $(R-M)'$ and $(B-M)'$ are the output signals from the variable matrix. A fixed matrix 272 is then provided in order to reconvert the M′, $(R-M)'$ and $(B-M)'$ signals to the corrected R′, G′ and B′ signals according to the matrix relationship:

$$\begin{vmatrix} R' \\ G' \\ B' \end{vmatrix} = \begin{vmatrix} -1 & -1 & 0 \\ -1 & +1 & +1 \\ -1 & 0 & -1 \end{vmatrix} \times \begin{vmatrix} M' \\ (R-M)' \\ (B-M)' \end{vmatrix} \qquad (4)$$

As explained above, in the matrix relationship of (1), it was required that the variable coefficients have sums equal to unity. In a system having a fixed matrix according to the matrix relationship (2), a variable matrix according to the relationship (3), followed by a fixed matrix having the relationship (4), the overall requirements that the row coefficients be equal to unity is satisfied by having the first column coefficients of the matrix (3) being equal to 1, 0 and 0. This results in six variable remaining in the second two columns in the matrix (3). The variables in the first row, however, may be made equal to zero, since they only have a minor effect on the color because they only affect the luminance signal. In the variable matrix of relationship (3), the four variables can be controlled by voltages applied to the terminals 273–276 from the converter 114.

Figure 8:
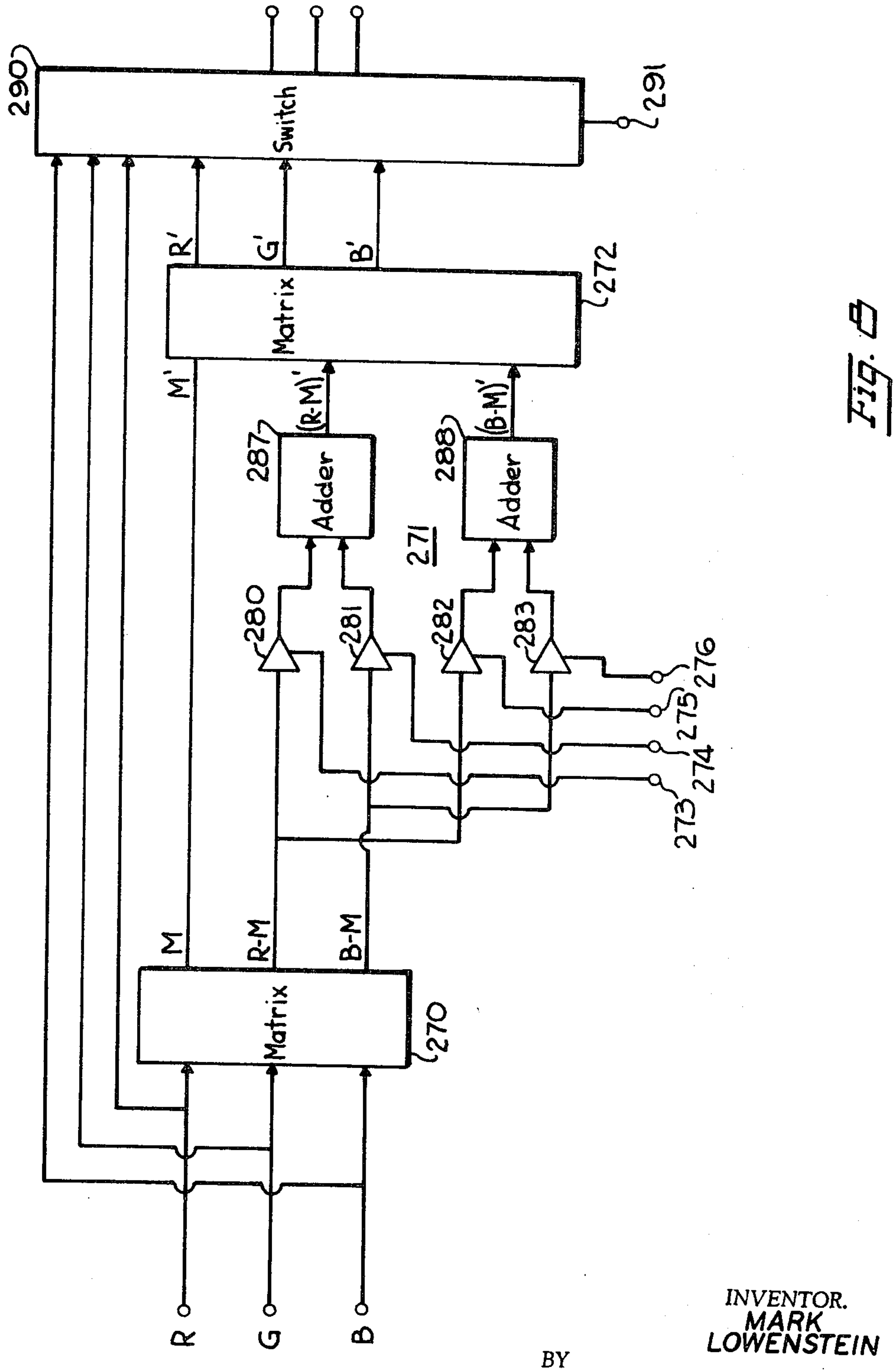
FIG. 8 is a block diagram of the linear matrix of the video channel of FIG. 7.

The variable matrix 271 of FIG. 8 may be comprised of four variable gain control amplifiers 280, 281, 282, and 283 having their gain control terminals connected to the terminals 273–276 respectively. The $R-M$ output of the matrix 270 is applied to amplifiers 280 and 282, and the $B-M$ outputs of the matrix 270 is applied to the inputs of amplifiers 281 and 283. The M signal output of the matrix 270 is applied directly to the matrix 272, since the M signal equals the M′ signal according to matrix relationship (3). The gain control signal applied to the terminals 273–276 correspond to the *j*, *k*, *l* and *m* quantities respectively of matrix relationship (3). The outputs of the amplifiers 280 and 281 are then added in adder 287 in order to provide the $(R-M)'$ signal, and the outputs of the amplifiers 282 and 283 are added in an adder 288 to provide the $(B-M)'$ signal.

If desired, the linear matrix circuit 260 of FIG. 8 may include a switch 290, to which the outputs of matrix 272 and the inputs of matrix 270 are applied. This switch has a terminal 291 for connection to an output of the decoder 113 (FIG. 4), in order to enable the control unit operator to select the outputs of the matrix 272, or bypass the linear matrix by applying the input of matrix 270 directly to the outputs of switch 290.

Referring again to FIG. 7, the red, green and blue video signal outputs of the linear matrix are applied to gamma and white clipping circuits 300, 301 and 302 respectively for providing the desired gamma correction, and clipping white peaks. Clamping signals for these circuits may be derived from the generator 236, and control of the gamma function may be obtained from voltages applied to terminals 303, 304 and 305 respectively which are connected to the converter 114.

The outputs of the gamma correction and white clipping circuits of FIG. 7 are applied to the encoder 262 for adding the contour correction signal and synchronizing signals and forming the video signal for transmission to the control unit. This circuit modulates the color signals on the color subcarrier, for example, according to the NTSC system, but preferably applies timing pulses from a timing pulse generator 306 instead of conventional synchronizing signals during the blanking period. The timing pulses are more convenient for use in the comparator 87 (FIG. 2) than conventional synchronizing signals. The output of the encoder 262 is applied to the modulator 22 for modulation on 27 mHz. oscillations from oscillator 23, and application to the transmission link by way of filter 24.

Additional outputs 315, 316 and 317 are provided from the preamplifiers 224–226 of FIG. 7 respectively, additional outputs 318, 319 and 320 are provided from the three outputs of the linear matrix, and additional outputs 321, 322 and 323 are provided from the gamma and white clipping circuits 300–302 respectively. These outputs are for use in the monitor circuit which will be discussed in detail in the following paragraphs with reference to FIG. 9.

Figure 9:
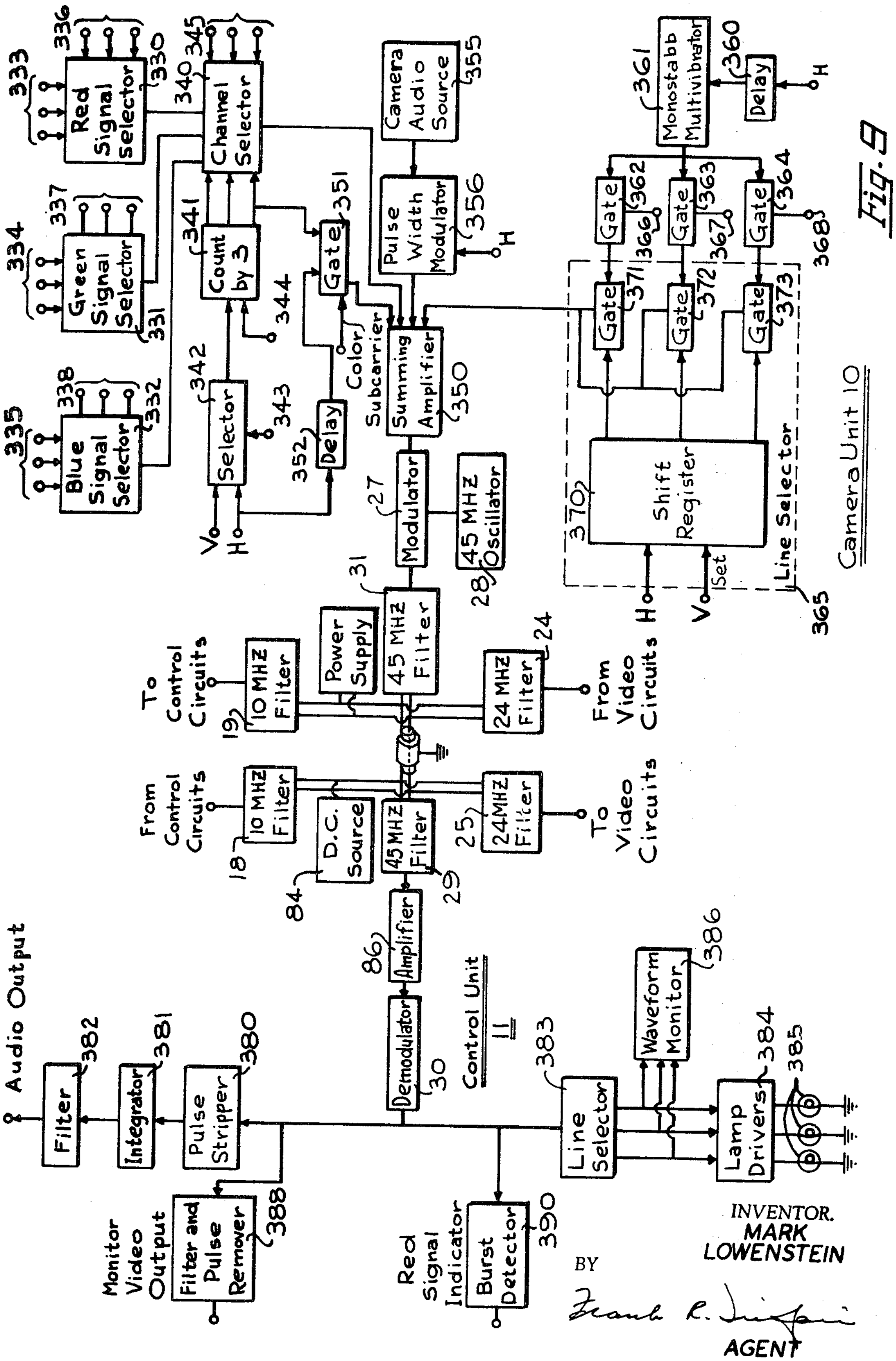
FIG. 9 is a block diagram of the monitor system of the television system of FIG. 1.

The monitor system in the camera and control untis is shown in more detail in FIG. 9. This system enables the control unit operator to continuously monitor to circuits of the camera unit. The monitor signal transmitted to the control unit consists essentially of a video signal selected from one or more points in the camera. Synchronizing signals are not necessary in the monitor signal, since these signals are already present in the signals transmitted in the video channel. Consequently, the line synchronizing pulses are replaced by pulse width modulated pulses in order to transmit audio signals from the camera to the control unit. In addition, pulses are transmitted during selected line intervals (preferably during the vetrical blanking period), in order to indicate the presence or absence of selected voltages in the camera unit.

Referring now to FIG. 9, video signals from selected points in the camera video channel are applied to the input terminals of red, green and blue selector switches 330, 331 and 332 respectively. Thus, for example, signals at the terminals 315, 318 and 321 in the red video channel (FIG. 7) may be applied to separate input terminals of the set of terminals 333 of red selector switch 330, the signals at the terminals 316, 319 and 322 in the green video channel (FIG. 7) may be applied to separate input terminals of the set of input terminals 334 of green selector switch 301, and signals at the terminals 317, 320 and 323 of the blue video channel and may be applied to separate input terminals of the set of terminals 335 of the blue selector switch 332. Additional input terminals may be provided if desired on the selector switches to enable monitoring of other video signals. The selector switches 330, 331 and 332 are also provided with sets of terminals 336, 337 and 338 connected to the decoder 113 (FIG. 4), in order to enable the control unit operator to select any desired selector switch input. If desired, the corresponding terminals of the sets of control terminals 336–338 of the selector switches may be interconnected, in order to reduce the required control functions, so that the outputs of the selector switches all correspond to the same functional stages in the video channel.

The outputs of the selector switches 330–332 (FIG. 9), which are thus selectde video signals from the red, green and blue channels respectively, are applied to a channel selector switch 340. In monitoring of the camera video signals there are a number of dfferent modes of operation that may be desired. For example, it may be desirable that the color signals be transmitted sequentially on a line-by-line basis, transmitted sequentially on a frame-by-frame basis, or that only selected color signals be transmitted. In order to provide sequential transmission of the color signals, a county-by-three circuit 341 is provided having three outputs connected to sequentially open gates in the channel selector 340 in response to pulses from the counter 341. The input pulses for the count-by-three circuit are obtained from a selector switch 343 to which horizontal and vertical synchronizing pulses are applied. A terminal 343 on the switch 342 is connected to the decoder 113 (FIG. 4) in order to permit selection of the horizontal or vertical pulses, and therefore permit selection of line-by-line or frame-by-frame sequential operation of the channel selector 340. The count-by-three circuit may be disabled by a signal applied to terminal 344 from the decoder 113 (FIG. 4), in order to enable selection of only one or more video signals in the selector 340. In this case, the selection of separate signals or signal combinations may be made by means of digital control signals applied to the terminals of set of control terminals 345 of the channel selector 315 from the digital decoder 113 of (FIG. 4). The output of the channel selector 340 is applied to one input of a summing amplifier 350. When the channel selector is operated sequentially by the count-by-three circuit, it is necessary to transmit an additional signal to enable the control unit to determine which color is being transmitted. This can be accomplished by transmitting a burst of the color subcarrier on the back porch of the blanking interval preceding the transmission of a selected one of the color signals for example, the red color signal. For this purpose, a gate circuit 351 is connected to be opened in response to coincidence of one input signal of the county-by-three circuit and a horizontal pulse (which may be delayed in delay network 352), in order to permit a burst of the color subcarrier oscillations to be applied to another input of the summing amplifier 350.

Audio signals from a source 355 of FIG. 9, such as a microphone at the camera unit, are applied to a pulse width modulator 356 for pulse width modulating horizontal synchronizing pulses. These modulated pulses, which appear in the blanking periods of the monitor video signal, are applied to another input to the summing amplifier 350.

In order to transmit pulses during selected line intervals to indicate the presence of certain voltages in the camera unit, horizontal synchronizing pulses are applied to a delay circuit 360 in FIG. 9 which energizes a monostable multivibrator 361 for producing wide pulses during the line periods. The output of multivibrator 361 is applied by way of a plurality of gates, such as gates 362, 363 and 364, to a line selector gate 365. The control terminals 366, 367 and 368 of the gates 337–339 respectively, are connected to selected potential points in the camera unit, for example, the view finder power supply, the camera power supply, etc., so that when these potentials are correct the corresponding pulses are passed to the line selector gate 365. The line selector gate 365 serves to apply the output pulses of gates 362–364 selectively to the summing amplifier during predetermined line intervals. Horizontal and vertical synchronizing pulses are applied to the gate 365 to time the opening of the gate to predetermined line periods. For example, the gate 365 may be opened during the fourteenth line interval following a vertical pulse to pass the output of gate 362, during the fifteenth line interval following a vertical pulse to pass the output of gate 362, etc. The number of voltages which may be monitored in the system is not limited to three, as shown, and any additional number of gates may be provided in the same manner as gates 362–364 in order to monitor the additional voltages. The line selector gate may consist, for example, of a shift register 370 connected to count in response to the horizontal pulses and to be set by vertical pulses (e.g. by applying a single pulse to the initial stage), with separate gates 371, 372 and 373 being connected to selected register stages for passing the input signals from gates 362–364 respectively. The outputs of gates 371–373 are applied to the summing amplifier 350.

The selected video signals, burst signal from gate 351, audio modulated pulses from modulator 356, and the voltage monitor pulses from selector 365 are linearly added in amplifier 350, and modulated in modulator 27 for application to the transmission path by way of filter 31.

In the control unit 11 (FIG. 9), the monitor signals after demodulation in demodulator 30 are applied to a pulse stripper 380 for selecting the pulse width modulated pulses. These pulses are then integrated in an integrator 381, and filtered in a low pass filter 382 (having a bandwidth of, for example, 3 kHz.), to recover the camera audio signals. The output of the demodulator 30 is also applied to a filter and pulse remover circuit 388, which removes the audio pulses from the monitor video signals. It is not necessary to add horizontal and vertical synchronizing pulses to the monitor video signals since the monitor videa signals are generally used only by the control unit operator, and separated synchronizing signals are already present in the control unit. A burst detector 390 is also connected to the output of the demodulator 30 in order to produce a signal output indicating the transmission of a given color signal (e.g. red). The burst detector may consist, for example, of a gate circuit opened at the proper times (e.g. during the back porches of the blanking periods) by means of horizontal and vertical synchronizing pulses which are available in the control unit, an integrator for integrating the color subcarrier input when it occurs, and a pulse forming circuit to develop an output pulse responsive to the occurrence of the burst signal. The output signal of the burst detector may be employed, for example, as a steering pulse to separate the monitor video color signals so that they can be applied to separate indicating screens.

Figure 10:
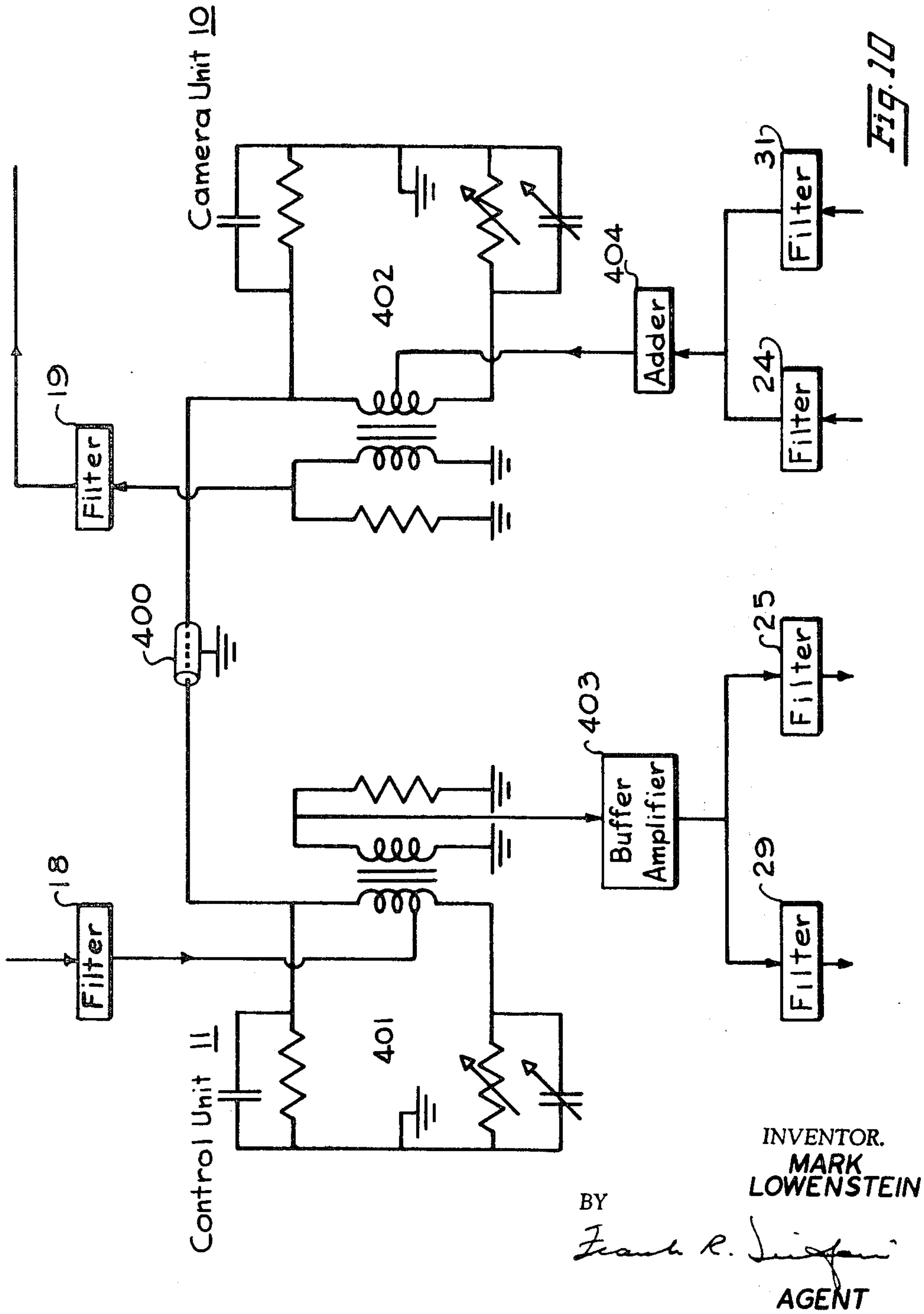
FIG. 10 is a partially schematic diagram of a preferred arrangement for interconnecting the control unit and camera unit of the system of FIG. 1.

In the previously described arrangements, the signals were applied and received directly from the transmission cable. In a preferred embodiment according to the invention, however, it has been found that improved separation of the signals is provided when fork filters are connected to the ends of the cable in order to separate signals transmitted along the transmission path in different directions. Thus, as shown in FIG. 10, the transmission path 400 is connected in the control unit 11 to a fork filter 401, and the other end of the transmision path 400 is connected in the camera unit 10 to a fork filter 402. The fork units 401 and 402 are of conventional construction. The filter 18 is connected to fork filter 401 to apply the modulated telecommand, modulated audio, and external video signals to the transmission path 400 by way of fork filter 401, and a buffer amplifier 403 is connected to the fork filter to receive the camera video and monitor signals. The output of the buffer amplifier 403 is applied to the camera video channel filter 25, and the monitor channel filter 29. In the camera unit, the signals from the control unit are applied by way of the fork filter 402 to the control signal filter 19. The outputs of the camera video filter 24 and monitor filter 21 are added in an adder 404, an are applied to the transmission path 400 by way of the fork filter 402. Direct operating voltages may also be applied to the transmission path 400 for use in the camera unit by isolating the fork filters 401 and 402 from ground potential, for example, by means of capacitors (not shown).

It will be understood, of course, that while the forms of the invention herein shown and described constitute the preferred embodiments of the invention, it is not intended herein to illustrate all of the equivalent forms of ramifications thereof. Thus, for example, other circuit configurations may be provided to code and decode the signals, and the video and monitor channels may also be similarly modified. In addition, it will be obvious that the transmission path may comprise a signal transmission system that does not employ conductors, for example, a radio link. It is consequently obvious that many modifications may be made without departing from the spirit and scope of the invention, and it is aimed in the appended claims to cover all such changes that fall within the true spirit and scope of the invention.

What is claimed is:

1. A television camera system comprising a camera unit, a control unit, and a transmission path between said camera and control units, said control unit comprising a source of a plurality of control signals each corresponding to a control function in said camera unit, a source of television synchronizing signals, means converting said control signals to a coded digital signal occurring during the back porches of said synchronizing signals, means for adding said synchronizing and coded digital signals, and means for transposing said added signals to a first frequency band and applying said transposed added signals to said path, said camera unit comprising means connected to said path for demodulating signals of said first frequency band, means for separating said demodulated signals to regenerate said coded digital signals, and means for converting said regenerated digital signals to regenerate said control signals, said camera unit further comprising a source of video signals, signal processing circuit means connected to receive said video signals, means for applying said control signals to said signal processing circuit means for controlling at least one characteristic of said video signals, and means for transposing the output of said signal processing circuit means to a second frequency band and applying said transposed output of said processing circuit means to said path, said control unit further comprising means connected to said path for demodulating signals of said second frequency band to produce output video signals.

2. A color television camera unit, a control unit, and a transmission path between said camera and control units, said control unit comprising a source of a plurality of control signals each corresponding to a control function of said camera unit, a source of television synchronizing signals, a source of color subcarrier oscillations, means for converting said control signals to a coded digital signal occurring during the back porches of said synchronizing signals and having a pulse repetition rate equal to the frequency of said color subcarrier oscillations, means for adding said synchronizing signals, coded digital signals and color subcarrier oscillations to produce a composite signal including said synchronizing signals, said coded digital signals occurring during the back porches of said synchronizing signals, and said subcarrier oscillations occurring during the active scanning period of said composite signal, and means for transposing said composite signal to a first frequency band and applying said transposed composite signal to said path, said camera unit comprising means connected to said path for demodulating signals of said first frequency band, means for separating said demodulated signals, means responsive to said separate subcarrier oscillations and synchronizing signals for producing color subcarrier and line and frame synchronizing signals for said camera unit, and means for converting said separated coded digital signals to regenerate said control signals, said camera unit further comprising a source of color video signals, signal processing circuit means connected to receive said video signals, means for applying said control signals to said signal processing circuit means for controlling at least one characteristic of said video signals, and means for transposing the output of said signal processing circuit means to a second frequency band and applying said transposed output of said processing circuit means to said path, said control unit further comprising means connected to said path for demodulating signals of said second frequency band to produce output video signals.

3. The color television system of claim 2 wherein said source of control signals comprises a source of a plurality of analog control signals and a source of a plurality of bivalent control signals, comprising first and second selector switch means, means for applying said analog and bivalent control signals to said first and second selector switch means respectively, analog-to-digital converting means connected to the output of said first selector switch means, means for applying the output of said first and second switch means to said means for adding signals in said control unit, and means for cyclically operating said selector switch means on a line-to-line basis.

4. The color television system of claim 3 wherein said means for converting said coded digital signals to regenerate said control signals in said camera unit comprises a separate first storage means including digital to analog decoder means corresponding to each said analog signal, separate second digital storage means corresponding to each said bivalent control signal, camera selecting switch means, means for applying said separated coded digital signals to said first and second storage means by way of said camera selecting switch means, and means for cyclically operating said camera identification switch means on a line-by-line basis whereby signals stored in said first and second storage means correspond to the respective analog and digital control signals in said control unit.

5. The color television camera system of claim 2 wherein said control unit comprises a source of audio signals, and means for modulating the output of said source of color subcarrier oscillations with said audio signals before said color subcarrier oscillations are applied to said adding means, and said camera unit comprises means for demodulating said separated color subcarrier signals to provide an audio output signal.

6. The color television system of claim 2 wherein said control unit comprises a source of external video signals, and means for applying said external video signals to said means for adding with a bandwith less than the frequency of said subcarrier oscillations.

7. The color television camera of claim 2 wherein said camera unit comprises a source of timing pulses, and means for adding said timing pulses to the output of said signal processing circuit means, said control unit comprises means for comparing said timing pulses with said synchronizing signal to produce one of said control signals, and said camera unit further comprises means responsive to said one control signal for controlling the timing of said synchronizing signals produced in said camera unit.

8. The color television camera of claim 7 wherein said means in said camera unit for producing color subcarrier and line and frame synchronizing signals comprises a color subcarrier locked oscillator, means for applying said separated subcarrier oscillations to said locked oscillator for synchronizing said locked oscillator, first frequency divider means connected to the output of said locked oscillator for producing line synchronizing signals, second frequency divider means connected to the output of said first frequency divider means for producing frame synchronizing signals, said first frequency divider means having a controllable division ratio, means for applying said one control signal to said first divider means for controlling the division ratio therein, and means responsive to said separated synchronizing signals connected to control the phase of said second divider means.

9. The system of claim 2 wherein said control unit comprises a source of camera identification signals, means for converting said camera identification signals to coded digital signals occurring during the back porches of said synchronizing signals, and means for adding said last mentioned coded digital signals to said back porches before said first mentioned coded digits, and said camera unit comprises means responsive to said last mentioned coded digits for inhibiting regeneration of said control signals when said last mentioned coded digits do not correspond to the camera unit.

10. The system of claim 2 wherein said control unit further comprises means responsive to said coded digital signal for generating a parity bit, and means for adding said parity bit to said back porches after said coded digital signal, and said camera means comprises means for inhibiting regeneration of said control signals when the received parity bit does not correspond to the received coded digital signal.

11. The color television camera system of claim 2 wherein said camera unit further comprises means for providing a source of camera monitoring signals, and means for transposing said monitoring signals to a third frequency band and applying said transposed monitoring signals to said path, and said control unit further comprises means connected to said path to demodulate signals of said third frequency band for producing an output monitor signal.

12. The color television system of claim 11 wherein said source of camera monitoring signals comprises selector switch means, means for connecting the inputs of said selector switch means to predetermined points in said signal processing circuit, means applying the output of said selector switch means to said means for transposing said monitoring signals, and means for applying at least one of said regenerated control signals to said selector switch means for controlling the application of signals at said points to said monitoring signal transposing means.

13. The color television system of claim 12 wherein said camera unit further comprises a source of audio signals, and said source of monitoring signals comprises a source of pulses occurring during the blanking periods of signals in said processing circuit, means for pulse width modulating said pulses with said audio signals, said means for applying the output of selector switch means to said means for transposing comprising adder means, and means applying said pulse width modulated pulses to said adder means.

14. The color television camera system of claim 12 wherein said means for connecting said selector switch means to said means for transposing means comprises adder means, and said source of monitoring signals further comprises means for producing pulses during selected line intervals corresponding to the occurrence of predetermined potentials in said camera unit, and means for applying said pulses to said adder means.

15. A color television camera system comprising a control unit, a camera unit, and a transmission path between said camera and control unit, said control unit comprising a source of a plurality of control signals each corresponding to a control function in said camera unit, a source of first television signals, means for converting said control signals to coded digital signals, means for cyclically adding said coded digital signals corresponding to each control signal to the back porch of the blanking period of a separate line of said first television signal, whereby the blanking period of each line of said first television signals following a frame synchronizing pulse corresponds to a separate predetermined control function, and means for transposing said added signals to a first frequency band and applying said transposed added signals to said path, said camera unit comprising means connected to said path for demodulating signals of said first frequency band, means for separating said coded digital signals from said demodulated signals, separate storage means corresponding to each said control signal, means connected to receive said separated coded digital signals for decoding said separated coded digital signals and applying said decoded signals to the corresponding storage means, said camera unit further comprising a source of color video signals, signal processing means connected to receive said color video signals, means for connecting at least one of said storage means to said processing means for controlling at least one characteristic of said color video signals, and means for transposing the output of said processing means to a second frequency band and applying said transposed output of said processing means to said transmission path, said control unit further comprising demodulator means connected to said path for demodulating signals in said second frequency band to produce output color video signals.

References Cited

UNITED STATES PATENTS

| | | | |
|---|---|---|---|
| 2,978,538 | 4/1961 | Breese | 178—5.6 |
| 3,215,774 | 11/1965 | Ikegami | 178—5.6 |
| 3,431,351 | 3/1969 | Sennhenn | 178—5.2 |
| 3,435,141 | 3/1969 | Hileman et al. | 178—69.5 |

ROBERT L. GRIFFIN, Primary Examiner
A. H. EDDLEMAN, Assistant Examiner